United States Patent [19]

Inoue et al.

[11] Patent Number: 4,987,155

[45] Date of Patent: Jan. 22, 1991

[54] FOAMABLE ORGANOPOLYSILOXANE COMPOSITION

[75] Inventors: Yoshio Inoue; Masatoshi Arai; Tsuneo Kimura, all of Gunma, Japan

[73] Assignee: Shin-Etsu Chemical Co., Ltd., Tokyo, Japan

[21] Appl. No.: 557,824

[22] Filed: Jul. 26, 1990

[30] Foreign Application Priority Data

Jul. 26, 1989 [JP] Japan .................................. 1-192976

[51] Int. Cl.$^5$ ............................................... C08J 9/02
[52] U.S. Cl. ........................................ 521/77; 521/91; 521/154; 525/477; 528/33
[58] Field of Search ................... 521/91, 154; 525/477; 528/33

[56] References Cited

U.S. PATENT DOCUMENTS

| | | | |
|---|---|---|---|
| 4,460,712 | 7/1984 | Blizzard et al. | 521/154 |
| 4,772,516 | 9/1988 | Mahone | 521/154 |
| 4,801,622 | 1/1989 | Inoue | 521/154 |

*Primary Examiner*—Morton Foelak
*Attorney, Agent, or Firm*—Millen, White & Zelano

[57] ABSTRACT

The invention provides a foamable organopolysiloxane composition capable of giving, by foaming and curing at room temperature, a silicone rubber foam of high foaming expansion having very uniform and dense cellular structure. The composition is prepared by a process comprising the steps of: (A) compounding an $\alpha,\omega$-dihydroxy dimethylpolysiloxane with a reinforcing silica filler, hexamethyl disilazane and water as the hydrolysis agent of the silazane to give a compound; (B) removing ammonia in the compound formed by the hydrolysis of the silazane compound as completely as possible; and (C) compounding the compound with a polyhydroxy methylpolysiloxane, an organohydrogenpolysiloxane and a platinum compound as a catalyst for the dehydrogenation reaction between the silanolic hydroxy groups and the silicon-bonded hydrogen atoms to produce hydrogen as the foaming gas.

10 Claims, No Drawings

FOAMABLE ORGANOPOLYSILOXANE COMPOSITION

BACKGROUND OF THE INVENTION

The present invention relates to a foamable organopolysiloxane composition or, more particularly, to an organopolysiloxane composition capable of foaming and curing at room temperature and giving a silicone rubber body having a cellular foam structure of high foaming expansion and excellent uniformity so as to be useful as a material of vibration- and shock-absorbers, sound- and heat-insulators, cushions and the like.

Various methods are known in the prior art for obtaining a cellular foam of a cured silicone rubber. Japanese Patent Publication No. 45-12675 teaches a type of foamable silicone rubber compositions prepared by compounding an unfoamable room temperature-curable silicone rubber composition with a suitable blowing agent as well as reaction-foamable silicone rubber compositions in which the foamability of the composition is correlated with the mechanism of curing of the composition or the foaming gas to expand the composition is formed as a by-product of the crosslinking reaction. For example, hydrogen gas as a foaming gas is produced by the dehydrogenation reaction between a first organosilicon compound, e.g., organopolysiloxanes, having hydrogen atoms directly bonded to the silicon atoms and a second organosilicon compound, e.g., organopolysiloxanes, having hydroxy groups directly bonded to the silicon atoms as promoted by a catalytic compound which may be a quaternary ammonium salt, heavy metal carboxylate, alkali metal alkoxide and the like as is disclosed in Japanese Patent Publications Nos. 33-9297 and 44-8755. Other known catalytic compounds effective for the above mentioned dehydrogenation reaction include hydroxylamine compounds and organosilicon compounds having an aminoxy group directly bonded to the silicon atom disclosed in Japanese Patent Publication No. 45-9794 and platinum compounds disclosed in Japanese Patent Kokai No. 51-46352.

The silicone rubber foams obtained by the above described methods each have disadvantages that the foaming expansion thereof cannot be high enough in addition to the poor uniformity of the cellular structure so that, when they are used as a heat-insulating material, for example, sufficiently high heat-insulating effects can hardly be obtained. It is also proposed in Japanese Patent Kokai No. 59-196330 to admix a foamable silicone rubber composition with an organopolysiloxane resin soluble in organic solvents with an object to improve the mechanical strength of the silicone rubber foam obtained therefrom. Such a foamable rubber composition, however, is not industrially practicable and is economically disadvantageous due to the high costs.

SUMMARY OF THE INVENTION

The present invention accordingly has an object to provide a novel and improved foamable organopolysiloxane composition capable of giving a silicone rubber foam without the above described disadvantages and problems in the prior art compositions.

Thus, the present invention provides a foamable organopolysiloxane composition prepared by a process comprising the steps of:

(A) blending (a) 100 parts by weight of an $\alpha,\omega$-dihydroxy diorganopolysiloxane represented by the general formula $$HO-(-SiR_2-O-)_p-H, \quad (I)$$

in which R is, each independently from the others, an unsubstituted or substituted monovalent hydrocarbon group free from aliphatic unsaturation and the subscript p is a positive integer in the range from 200 to 3000, (b) from 10 to 80 parts by weight of a silica filler having a specific surface area of at least 50 m$^2$/g, (c) an organosilazane compound represented by the general formula $$[R^1{}_3Si-(-O-SiR^1{}_2-)_q-]_2NH, \quad (II)$$

in which $R^1$ is, each independently from the others, an unsubstituted or substituted monovalent hydrocarbon group and the subscript q is zero or a positive integer not exceeding 24, in an amount in the range from 0.062 to 0.25 mole per 100 g of the silica filler as the component (b), and (d) from 0.5 to 10 parts by weight of water to effect hydrolysis of the organosilazane compound as the component (c) producing ammonia as a hydrolysis product, to give an organopolysiloxane compound;

(B) removing the ammonia from the organopolysiloxane compound obtained in step (A) by evaporation under mixing at a temperature in the range from room temperature to 200° C. until the content of the ammonia in the organopolysiloxane compound is decreased to 50 ppm by weight or smaller; and (C) uniformly admixing the organopolysiloxane compound obtained in step (B) with (e) a polyhydroxy organopolysiloxane represented by the general formula $$R_3Si-O-[-SiR_2-O-]_r-[-SiR(OH)-O-]_s-SiR_3, \quad (III)$$

in which R has the same meaning as defined above, the subscript r is a positive integer in the range from 2 to 20 and the subscript s is a positive integer in the range from 3 to 20, in an amount in the range from 0.01% to 50% by weight based on the amount of the organopolysiloxane compound obtained in step (B), (f) an organohydrogenpolysiloxane having hydrogen atoms directly bonded to the silicon atoms and having, in a molecule, at least two organosiloxane units represented by the unit formula $$R_aH_bSiO_{(4-a-b)/2}, \quad (IV)$$

in which R has the same meaning as defined above, the subscript a is 0, 1 or 2 and the subscript b is 1, 2 or 3 with the proviso that a+b is 1, 2 or 3, in such an amount as to give from 0.5 to 30 moles of the silicon-bonded hydrogen atoms per mole as a total of the hydroxy groups in the components (a) and (e), and (g) a platinum compound in an amount in the range from 0.1 ppm to 200 ppm by weight as platinum based on the total amount of the components (a) to (f).

DETAILED DESCRIPTION OF THE PREFERRED EMBODIMENTS

As is described above, the foamable organopolysiloxane composition of the present invention comprises, as the essential constituents, the above described components (a) to (g). It is, however, essential that the components (a) to (d) are first blended in step (A) and mixed together in step (B) until the content of ammonia produced by the hydrolysis of the organosilazane compound as the component (c) with water as the component (d) is decreased by dissipation not to exceed 50 ppm by weight of the total amount of the components before the mixture is further compounded with the components (e) to (g) in step (C). When the organopolysiloxane compound prepared by blending and mixing the components (a) to (d) is further admixed with the components (e) to (g), the dehydrogenation reaction takes place between the silanolic hydroxy groups at the moloecular chain terminals of the component (a) as well as the silicon-bonded hydroxy groups in the polyhydroxy organopolysiloxane as the component (e) and the silicon-bonded hydrogen atoms in the organohydrogenpolysiloxane as the component (f) as promoted by the catalytic activity of the platinum compound as the component (g) to produce hydrogen gas which serves as a blowing agent to effect foaming expansion of the composition along with curing so that a silicone rubber foam can be obtained.

The component (a) is an α,ω-dihydroxy diorganopolysiloxane represented by the general formula

HO—(—SiR$_2$—O—)$_p$—H.   (I)

In the general formula (I), the symbol R denotes, each independently from the others, a monovalent hydrocarbon group having 1 to 10 or, preferably, 1 to 8 carbon atoms and free from aliphatic unsaturation exemplified by alkyl groups, e.g., methyl, ethyl, propyl, butyl, pentyl and hexyl groups, aryl groups, e.g., phenyl and naphthyl groups, and aralkyl groups, e.g. benzyl and 2-phenylethyl groups, as well as those substituted hydrocarbon groups obtained by replacing a part or all of the hydrogen atoms in the above named hydrocarbon groups with substituent atoms and/or groups such as halogen atoms, cyano groups and the like exemplified by chloromethyl, 3,3,3-trifluoropropyl and 2-cyanoethyl groups. It is preferable that at least 50% by moles or, more preferably, all of the groups denoted by R are methyl groups. The subscript p in the general formula (I), which gives the average degree of polymerization of the diorganopolysiloxane, is a positive integer in the range from 200 to 3000. When the value of p is too small, the silicone rubber foam obtained by foaming and curing the composition would not have sufficiently high elongation. When the value of p is too large, on the other hand, certain difficulties may be encountered in the compounding works of the composition as well as in the subsequent handling of the composition.

The component (b) compounded with the diorganopolysiloxane as the component (a) is a finely divided silica filler having a specific surface area of at least 50 m²/g or, preferably, at least 100 m²/g. The silica filler can be any of known ones conventionally used as a filler in silicone rubber compositions including so-called fumed silica fillers prepared by a dry process from silicon tetrachloride, trichlorosilane and the like and wet-process or so-called precipitated silica fillers prepared by the hydrolysis of sodium silicate and the like. More preferably, the silica filler as the component (b) is a fumed silica filler having a specific surface area of 200 to 400 m²/g in order that the slicone rubber foam obtained by foaming and curing the composition may have a high tear strength. When the specific surface area of the silica filler is too small, no sufficient reinforcing effect can be obtained therewith. The amount of the silica filler as the component (b) used in the composition is in the range from 10 to 80 parts by weight per 100 parts by weight of the diorganopolysiloxane as the component (a). When the amount of the silica filler is too small, no sufficient reinforcing effect can be obtained. When the amount of the silica filler is too large, on the other hand, difficulties are encountered in compounding a so large amount of the filler with the other components in addition to the problem that the silicone rubber foam obtained by foaming and curing the composition would be too rigid to exhibit rubbery elasticity.

The component (c) compounded with the above described components (a) and (b) is an organosilazane compound represented by the general formula

[R$^1_3$Si—(—O—SiR$^1_2$—)$_q$—]$_2$NH.   (II)

In the formula (II), the symbol R$^1$ denotes, each independently from the others, a monovalent hydrocarbon group having 1 to 10 or, preferably, 1 to 8 carbon atoms exemplified by alkyl groups, e.g., methyl, ethyl, propyl, butyl, pentyl and hexyl groups, alkenyl groups, e.g., vinyl and allyl groups, aryl groups, e.g., phenyl, tolyl and naphthyl groups, and aralkyl groups, e.g., benzyl and 2-phenylethyl groups, as well as those substituted hydrocarbon groups obtained by replacing a part of all of the hydrogen atoms in the above named hydrocarbon groups with substituent atoms and/or groups such as halogen atoms, cyano groups and the like exemplified by chloromethyl, 3,3,3-trifluoropropyl and 2-cyanoethyl groups. The subscript q is zero or a positive integer not exceeding 24 or, preferably not exceeding 20.

Examples of the organosilazane compound suitable as the component (c) include those expressed by the following formulas, in which the symbols Me, Vi and Ph denote a methyl group, vinyl group and phenyl group, respectively:

(Vi$_n$Me$_{3-n}$Si)$_2$NH, n being 0, 1, 2 or 3; [(CF$_3$CH$_2$CH$_2$)(Me)$_2$Si]$_2$NH; (PhMe$_2$Si)$_2$NH; [Me$_3$Si—(—O—SiMe$_2$)$_m$]$_2$NH, m being a positive integer not exceeding 24; [ViMe$_2$Si—(—O—SiMe$_2$)$_m$]$_2$NH, m being the same as defined above; and

[Me$_3$Si—(—O—SiMeVi)$_u$—(—O—SiMe$_2$)$_v$]$_2$NH, u and v each being a positive integer with the proviso that u+v does not exceed 24. Hexamethyl disilazane can be used satisfactorily.

The amount of the organosilazane compound as the component (c) compounded with the components (a) and (b) is in the range from 0.062 to 0.25 mole per 100 g of the silica filler as the component (b). When the amount thereof is too small, the desired effect to be obtained by the addition thereof cannot be obtained as a matter of course, in particular, with a somewhat decreased flowability of the composition to cause a difficulty in molding. When the amount thereof is too large, on the other hand, the excess amount thereof must be removed in step (B) together with ammonia in addition to the problem that no further improvement can be obtained by increasing the amount over the above mentioned upper limit rather to cause an economical disadvantage.

The component (d) compounded together with the above described components (a) to (c) is water which serves as a hydrolysis agent of the organosilazane compound as the component (c). The amount of water is in the range from 0.5 to 10 parts by weight per 100 parts by weight of the diorganopolysiloxane as the component (a). When the amount of water as the component (d) is too small, the organosilazane compound as the component (c) is hydrolyzed only incompletely not to exhibit the desired effect. When the compounded amount thereof is too large, on the other hand, the excess amount thereof must be removed in the step (B) together with ammonia taking a great deal of labor and time to cause a great economical disadvantage.

The above described components (a) to (d) each in a specified amount are blended together in step (A) to give a uniform organopolysiloxane compound. By this blending, the organosilazane compound as the component (c) is hydrolyzed and reacts with the surface of the silica filler as the component (b) to form ammonia as a by-product of the hydrolysis reaction. It is preferable that the blending work of these components is performed in a closed vessel first at room temperature, e.g., about 20° C., and then at an increased temperature of 80° to 200° C. or, preferably, 100° to 150° C. for a length of time of, for example, 0.5 to 2 hours to effect aging.

The thus obtained organopolysiloxane compound is then subjected in step (B) to a treatment for the removal of the ammonia produced by the hydrolysis of the organosilazane compound. This treatment is performed by mixing or kneading the compound in an open vessel at a temperature of, for example, 100° to 200° C. or under reduced pressure at a temperature of, for example, 80° to 150° C. The length of time taken for this treatment naturally depends on various factors but it is essential that the treatment is continued until the content of ammonia in the compound is decreased not to exceed 50 ppm by weight or, desirably, not to exceed 10 ppm by weight.

The organopolysiloxane compound freed from ammonia in step (B) is then compounded in step (C) with the components (e) to (g). The component (e) is a polyhydroxy organopolysiloxane represented by the general formula

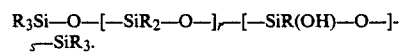

$$R_3Si-O-[-SiR_2-O-]_r-[-SiR(OH)-O-]_s-SiR_3. \quad (III)$$

In the formula (III), each R has the same meaning as defined for the general formula (I) given above. It is preferable that all of the groups denoted by R in the polyhydroxy organopolysiloxane are methyl groups in respect of the availability. The subscripts r and s in the formula are each a positive integer in the range from 2 to 20 and from 3 to 20, respectively, or, preferably, each in the range from 10 to 20. When the value of s is smaller than 3, the foamable silicone rubber composition cannot be expanded fully by foaming due to the deficiency in the amount of the silicon-bonded hydroxy groups from which hydrogen gas is produced by the dehydrogenation reaction with the component (f) to serve as an expanding gas.

The amount of the component (e) in the inventive composition is in the range from 0.01 to 50% by weight or, preferably, from 1 to 20% by weight based on the amount of the organopolysiloxane compound obtained in step (B) described above. When the amount thereof is too small, sufficiently high expansion cannot be obtained of the foamable silicone rubber composition due to the deficiency in the amount of the silicon-bonded hydroxy groups to pertain to the dehydrogenation reaction. When the amount thereof is excessively large, on the other hand, the silicone rubber foam obtained from the foamable composition would have a poor mechanical strength.

The component (f) is an organohydrogenpolysiloxane having, in a molecule, at least two siloxane units represented by the general unit formula

$$R_aH_bSiO_{(4-a-b)/2}. \quad (IV)$$

In the formula, R has the same meaning as defined for the general formula (I) or, preferably, is a methyl group. The subscript a is zero or a positive integer of 1 or 2 and the suubscript b is a positive integer of 1, 2 or 3 with the proviso that a+b is smaller than 4. The silicon atom to which a hydrogen atom is directly bonded can be at any position in the molecular structure including the molecular chain terminals and any intermediate positions between the terminals. The molecular structure of the organohydrogenpolysiloxane as the component (f) is not particularly limitative including straightly linear, branched chain-like and circular ones, of which linear molecular structures of the organopolysiloxane are preferable. Besides the above mentioned siloxane units of the general unit formula (III), the organohydrogenpolysiloxane as the component (f) can contain organosiloxane units having no silicon-bonded hydrogen atom such as those represented by the general unit formulas $R_3SiO_{0.5}$, $R_2SiO$, $RSiO_{1.5}$ and $SiO_2$, in which R has the same meaning as defined above. At any rate, it is preferable that the number of silicon atoms in a molecule of the organohydrogenpolysiloxane siloxane does not exceed 300.

The amount of the organohydrogenpolysiloxane as the component (f) in the inventive composition should be such that from 0.5 to 30 moles or, preferably, from 2 to 20 moles of the silicon-bonded hydrogen atoms are provided per mole as a total of the silanolic hydroxy groups in the components (a) and (e) in view of the role played by this component which pertains to the dehydrogenation reaction with the silanolic hydroxy groups in the components (a) and (e) to form crosslinks along with formation of hydrogen gas as an expanding gas for foaming. When the amount of the silicon-bonded hydrogen atoms is too small, no highly expanded silicone rubber foams can be obtained along with poor uniformity of the cellular structure and incomplete curing of the composition. When the amount thereof is too large, on the other hand, the silicone rubber foam obtained from the composition would have a low mechanical strength.

The component (g) is a catalytic ingredient to promote the dehydrogenation reaction between the silanolic hydroxy groups in the components (a) and (e) and the silicon-bonded hydrogen atoms in the component (f). Although elementary platinum such as platinum black is effective, the component (g) is preferably a platinum compound such as chloroplatinic acid, platinum complexes of an olefin compound, platinum complexes of a vinyl-containing organopolysiloxane, platinum complexes of a phosphine compound and the like, of which the platinum complexes of an olefin compound are the most preferable in respect of the stability of the composition before curing and adequate controllability of the velocity in the foaming process.

The amount of the catalytic platinum compound as the component (g) in the inventive composition is in the range from 0.1 to 200 ppm by weight or, preferably, from 1 to 50 ppm by weight as platinum based on the overall amount of the other components (a) to (f). When the amount thereof is too small, the velocity of the dehydrogenation reaction cannot be high enough. On the other hand, no further improvement can be obtained in the velocity of the dehydrogenation reaction even by increasing the amount of the platinum compound over the above mentioned upper limit rather with an economical disadvantage as a consequence of the expensiveness of the platinum compound.

The foamable organopolysiloxane composition of the invention can be prepared from the above described components (a) to (g) by first uniformly blending the components (a) to (d) to give an organopolysiloxane compound which is then subjected to a treatment for the removal of the ammonia and then compounded uniformly with the components (e) to (g). It is of course optional that the inventive foamable organopolysiloxane composition is further admixed according to need with various kinds of known additives including, for example, an organopolysiloxane having no or only one silanolic hydroxy group bonded at one of the molecular chain ends, vinyl-containing organosilane or organopolysiloxane compound, fillers of other types than the component (b), coloring agents, i.e. pigments and dyes, heat-resistance improvers, flame retardants, acetylene alcohols and derivatives thereof to control the reaction velocity, and the like each in a limited amount.

When the foamable organopolysiloxane composition prepared in the above described manner is introduced into a mold of a suitable form and agitated and, if necessary, heated therein, the dehydrogenation reaction takes place between the silanolic hydroxy groups in the components (a) and (e) and the silicon-bonded hydrogen atoms in the component (f) as promoted by the catalytic component (g) to produce hydrogen gas which serves as an expanding gas for foaming. Thus, foaming and curing of the composition concurrently proceed to form a silicone rubber foam of uniform and dense cellular structure, of which the ratio of foaming expansion can be as high as 270% to 350%, hardness, Ascar C, is 11 to 19, ultimate elongation is 120% to 170% and tensile strength is 1.9 kgf/cm$^2$ to 3.3 kgf/cm$^2$. The silicone rubber foam is useful as a vibration-and/or shock-absorbing material, sound- and heat-insulating material, cushoning material and the like.

In the following, the foamable silicone rubber composition of the invention is described in more detail by way of examples and comparative examples, in which the term of "parts" always refers to "parts by weight" and the values of viscosity are all those obtained by the measurement at 25° C.

EXAMPLE 1 AND COMPARATIVE EXAMPLE 1

Into a kneader of 3 liter capacity were introduced 500 g of an α,ω-dihydroxy dimethylpolysiloxane having a viscosity of 2000 centistokes, 75 g of hexamethyl disilazane and 37.5 g of deionized water having a pH of 6.9 and they were blended together at room temperature for 5 minutes. Thereafter, 230 g of a fumed silica filler having a specific surface area of 300 m$^2$/g (Aerosil 300, a product by Nippon Aerosil Co.) were introduced into the kneader and mixing of the mixture was continued in the closed kneader for 1 hour at 120° C. Then, the kneader was opened and mixing was further continued at 160° C. for 3 hours until the odor of ammonia could no longer be felt.

The mixture in the kneader was further admixed with 250 g of the same α,ω-dihydroxy dimethylpolysiloxane as used above followed by cooling to room temperature and admixture of 200 g of a trimethylsiloxy-terminated dimethylpolysiloxane having a viscosity of 30 centistokes and 50 g of a dimethylhydroxysiloxy-terminated dimethylpolysiloxane having a viscosity of 30 centistokes. The mixture was finally kneaded on a three-roller mill to be rendered fully uniform. The mixture, which is referred to as the composition A-1 hereinbelow, had a viscosity of 1500 poise which was only slightly increased to 1550 poise by heating for 2 hours at 150° C. The content of ammonia therein was 10 ppm by weight.

A 100 parts portion of the above obtained composition A-1 was admixed with 4 parts of a polyhydroxy methyl polysiloxane having a viscosity of 150 centistokes and expressed by the formula

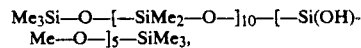
$Me_3Si-O-[-SiMe_2-O-]_{10}-[-Si(OH)-Me-O-]_5-SiMe_3$, in which, and hereinafter, Me is a methyl group, 6 parts of a methylhydrogenpolysiloxane expressed by the formula

$Me_3Si-O-[-SiHMe-O-]_{38}-SiMe_3$, a 2% by weight isopropyl alcohol solution of chloroplatinic acid in an amount of 1 ppm as platinum based on the amount of the composition A-1 and 10 parts of a dimethylpolysiloxane having a viscosity of 20 centistokes and expressed by the formula

$Me_3Si-O-[-SiMe_2-O-]_{11}-SiMe_3$, thus to obtain a foamable silicone rubber composition, referred to as the foamable composition I hereinbelow, having a viscosity of 250 poise. The molar ratio of the silicon-bonded hydrogen atoms to the silicon-bonded hydroxy groups in the organopolysiloxane constituents was 5 in the thus prepared foamable composition I.

A 200 g portion of this foamable composition I was introduced into a polyethylene-made foaming box having an inner diameter of 10 cm and a depth of 15 cm and kept standing there at 20° C. Foaming of the composition was started after about 3 minutes and expansion by foaming was completed within 5 to 10 minutes thereafter to give a silicone rubber foam of 330% expansion having excellently uniform and dense cellular structure. Table 1 given below shows the mechanical properties of this silicone rubber foam.

For comparison, the same procedure as above was repeated except that the composition A-1 was replaced with the same amount of another organopolysiloxane composition, referred to as the composition A-2 hereinbelow, which was prepared by admixing 500 g of the same α,ω-dihydroxy dimethylpolysiloxane with 75 g of the same fumed silica filler first at room temperature for 5 minutes and then at 150° C. for 2 hours under a sealed condition followed by further admixture of 200 g of the same trimethylsiloxy-terminated dimethylpolysiloxane and 50 g of the same dimethylhydroxysiloxy-terminated dimethylpolysiloxane finalizing the blending work by kneading on a three-roller mill to give a uniform blend.

The thus obtained foamable silicone rubber composition, referred to as the foamable composition II hereinbelow, had a viscosity of 650 poise. The molar ratio of the silicon-bonded hydrogen atoms to the silicon-bonded hydroxy groups was 5 in the thus prepared foamable composition II. The composition gave a silicone rubber foam of 270% expansion by foaming in the same manner as for the foamable composition I. The cellular structure of the foam, however, was apparently less uniform than the foam prepared from the foamable composition I. The mechanical properties of the foam are shown also in Table 1 below.

EXAMPLES 2 AND 3 AND COMPARATIVE EXAMPLE 2

In Example 2, a foamable silicone rubber composition, referred to as the foamable composition III hereinbelow, was prepared, in substantially the same manner as in the preparation of the foamable composition I, from 100 parts of the organopolysiloxane composition A-1, 1 part of the same polyhydroxy methyl polysiloxane, 8 parts of the same methylhydrogenpolysiloxane and 0.7 ppm by weight as platinum of the same isopropyl alcohol solution of chloroplatinic acid. The foamable composition III had a viscosity of 300 poise. The molar ratio of the silicon-bonded hydrogen atoms to the silicon-bonded hydroxy groups was 15 in the thus prepared foamable composition III.

In Example 3 for the preparation of a further foamable composition IV, the formulation was just the same as for the foamable composition III excepting additional admixture of 15 parts of the same dimethylpolysiloxane having a viscosity of 20 centistokes as used in the foamable composition I. This foamable composition IV had a viscosity of 200 poise. The molar ratio of the silicon-bonded hydrogen atoms to the silicon-bonded hydroxy groups was 5 in the thus prepared foamable composition IV.

The formulation in Comparative Example 2 for the preparation of a comparative foamable composition V was just the same as in the preparation of the foamable composition IV described above excepting replacement of the organopolysiloxane composition A-1 with the same amount of the organopolysiloxane composition A-2 used in Comparative Example 1. The foamable composition V had a viscosity of 350 poise. The molar ratio of the silicon-bonded hydrogen atoms to the silicon-bonded hydroxy groups was 5 in the thus prepared foamable composition V.

The foamable compositions III, IV and V were each subjected to foaming to give silicone rubber foams of 350%, 340% and 300% expansion, respectively. The cellular structure of the foams prepared from the foamable compositions III and IV was as satisfactory as in the foam obtained from the foamable composition I while the cellular structure of the foam prepared from the foamable composition V was apparently less uniform.

EXAMPLES 4 AND 5

The formulation of the foamable compositions, referred to as the foamable compositions VI and VII hereinbelow, and the experimental procedure in Examples 4 and 5 were just the same as in Example 2 described above except that the organopolysiloxane composition A-1 was replaced with the same amount of another organopolysiloxane composition A-3 or A-4, respectively, each prepared in the same manner as in the preparation of A-1 by replacing 75 g of hexamethyl disilazane with 1425 g of a different disilazane compound expressed by the formula [Me$_3$Si—(—O—SiMe$_2$—)$_{20}$]$_2$NH or 130 g of a further different disilazane compound expressed by the formula [Me$_3$Si—(—O—SiMePh—)$_2$]$_2$NH, respectively. The viscosities of the foamable compositions VI and VII were 250 poise and 310 poise, respectively. The molar ratios of the silicon-bonded hydrogen atoms to the silicon-bonded hydroxy groups were 20 and 15 in the thus prepared foamable compositions VI and VII, respectively.

Each of these foamable composition was subjected to the foaming test in the same manner as in Example 1 to give results as satisfactory as in Example 1. The mechanical properties of the thus prepared silicone rubber foams are also shown in Table 1 below.

TABLE 1

| Foamable composition | I | II | III | IV | V | VI | VII |
|---|---|---|---|---|---|---|---|
| Hardness, Ascar C | 11 | 16 | 19 | 13 | 17 | 12 | 20 |
| Ultimate elongation, % | 120 | 130 | 170 | 170 | 110 | 160 | 170 |
| Tensile strength, kgf/cm$^2$ | 3.3 | 2.7 | 3.3 | 3.0 | 1.7 | 2.8 | 3.3 |
| Expansion by foaming, % | 330 | 270 | 350 | 340 | 300 | 300 | 320 |

What is claimed is:
1. A foamable organopolysiloxane composition prepared by a process comprising the steps of:
(A) blending (a) 100 parts by weight of an α,ω-dihydroxy diorganopolysiloxane represented by the general formula

$$HO-(-SiR_2-O-)_p-H,$$

in which R is, each independently from the others, an unsubstituted or substituted monovalent hydrocarbon group free from aliphatic unsaturation and the subscript p is a positive integer in the range from 200 to 3000, (b) from 10 to 80 parts by weight of a silica filler having a specific surface area of at least 50 m$^2$/g, (c) an organosilazane compound represented by the general formula $$[R^1{}_3Si-(-O-SiR^1{}_2-)_q-]_2NH,$$

in which R$^1$ is, each independently from the others, an unsubstituted or substituted monovalent hydrocarbon group and the subscript q is zero or a positive integer not exceeding 24, in an amount in the range from 0.062 to 0.25 mole per 100 g of the silica filler as the component (b), and (d) from 0.5 to 10 parts by weight of water to effect hydrolysis of the organosilazane compound as the component (c) producing ammonia as a hydrolysis product, to give an organopolysiloxane compound;
(B) removing the ammonia from the organopolysiloxane compound obtained in step (A) by evaporation under mixing at a temperature in the range from room temperature to 200° C. until the content of the ammonia in the organopolysiloxane compound is decreased to 50 ppm by weight or smaller; and
(C) uniformly admixing the organopolysiloxane compound obtained in step (B) with (e) a polyhydroxy organopolysiloxane represented by the general formula $$R_3Si-O-[-SiR_2-O-]_r-[-SiR(OH)-O-]_s-SiR_3,$$

in which R has the same meaning as defined above, the subscript r is a positive integer in the range from 2 to 20 and the subscript s is a positive integer in the range from 3 to 20, in an amount in the range from 0.01% to 50% by weight based on the amount of the organopolysiloxane compound obtained in step (B), (f) an organohydrogenpolysiloxane having hydrogen atoms directly bonded to the silicon atoms and having, in a molecule, at least two organosiloxane units represented by the unit formula $$R_a H_b SiO_{(4-a-b)/2},$$

in which R has the same meaning as defined above, the subscript a is 0, 1 or 2 and the subscript b is 1, 2 or 3 with the proviso that a+b is 1, 2 or 3, in such an amount as to give from 0.5 to 30 moles of the silicon-bonded hydrogen atoms per mole of the hydroxy groups in the components (a) and (e), and (g) a platinum compound in an amount in the range from 0.1 ppm to 200 ppm by weight as platinum based on the total amount of the components (a) to (f).

2. The foamable organopolysiloxane composition as claimed in claim 1 wherein the subscript q in the general formula representing the component (c) is zero or a positive integer not exceeding 20.

3. The foamable organopolysiloxane composition as claimed in claim 1 wherein the organosilazane compound as the component (c) is hexamethyl disilazane.

4. The foamable organopolysiloxane composition as claimed in claim 1 wherein the silica filler as the component (b) is a fumed silica filler having a specific surface area in the range from 200 to 400 m²/g.

5. The foamable organopolysiloxane composition as claimed in claim 1 wherein the organopolysiloxane compound is freed from ammonia in step (B) to such an extent that the content of ammonia therein does not exceed 10 ppm by weight.

6. The foamable organopolysiloxane composition as claimed in claim 1 wherein the subscripts r and s in the general formula representing the component (e) is each a positive integer in the range from 10 to 20.

7. The foamable organopolysiloxane composition as claimed in claim 1 wherein the amount of the component (e) is in the range from 1 to 20% by weight based on the organopolysiloxane compound obtained in step (B).

8. The foamable organopolysiloxane composition as claimed in claim 1 wherein the amount of the component (f) is in such a range that from 2 to 20 moles of the silicon-bonded hydrogen atoms are provided per mole of the hydroxy groups in the components (a) and (e).

9. The foamable organopolysiloxane composition as claimed in claim 1 wherein the platinum compound as the component (g) is chloroplatinic acid or a complex of platinum with an olefin.

10. The foamable organopolysiloxane composition as claimed in claim 1 wherein the organopolysiloxane compound obtained in step (A) is, prior to step (B), subjected to an aging treatment by heating at a temperature in the range from 80° to 200° C. for 0.5 to 2 hours in a closed vessel.

* * * * *